United States Patent
Wu et al.

(10) Patent No.: US 8,355,000 B2
(45) Date of Patent: Jan. 15, 2013

(54) TUMBLER MOUSE

(75) Inventors: Kun-Tsan Wu, Taipei Hsien (TW); Li-Wen Tien, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 531 days.

(21) Appl. No.: 12/624,850

(22) Filed: Nov. 24, 2009

(65) Prior Publication Data

US 2010/0259480 A1    Oct. 14, 2010

(30) Foreign Application Priority Data

Apr. 13, 2009  (CN) .......................... 2009 1 0301535

(51) Int. Cl.
*G06F 3/033*    (2006.01)

(52) U.S. Cl. ....................................................... 345/163

(58) Field of Classification Search ........... 345/163–166
See application file for complete search history.

(56) References Cited

U.S. PATENT DOCUMENTS

2007/0069088 A1*   3/2007  Bidiville et al. ........... 248/188.9

FOREIGN PATENT DOCUMENTS

| CN | 2765249 Y | 3/2006 |
|----|-----------|--------|
| CN | 1804772 A | 7/2006 |

* cited by examiner

*Primary Examiner* — Adam R Giesy
(74) *Attorney, Agent, or Firm* — Altis Law Group, Inc.

(57) ABSTRACT

A tumbler mouse includes a housing including a swaying portion and a balancing weight secured in the housing. When the tumbler mouse is stood vertically on a support surface, it can sway as a tumbler.

14 Claims, 6 Drawing Sheets

TUMBLER MOUSE

BACKGROUND

1. Technical Field

The present disclosure relates to mice, and particularly, to a tumbler mouse for desktop computer, notebook and etc.

2. Description of Related Art

A mouse is a hand-held, button-activated pointing/inputting device used in a computer. The mouse directs an indicator to move in a computer screen, and is configured for selecting operations or texts or graphics. However, this kind of the mouse usually has limited functions and lacks creativity.

Therefore, there is a room for improvement within the art.

BRIEF DESCRIPTION OF THE DRAWINGS

Many aspects of mouse can be better understood with reference to the following drawings. The components in the drawings are not necessarily to scale, the emphasis instead being placed upon clearly illustrating the principles of the present mouse. Moreover, in the drawings, like reference numerals designate corresponding parts throughout the several views.

DETAILED DESCRIPTION OF THE EMBODIMENTS

Figure 1:
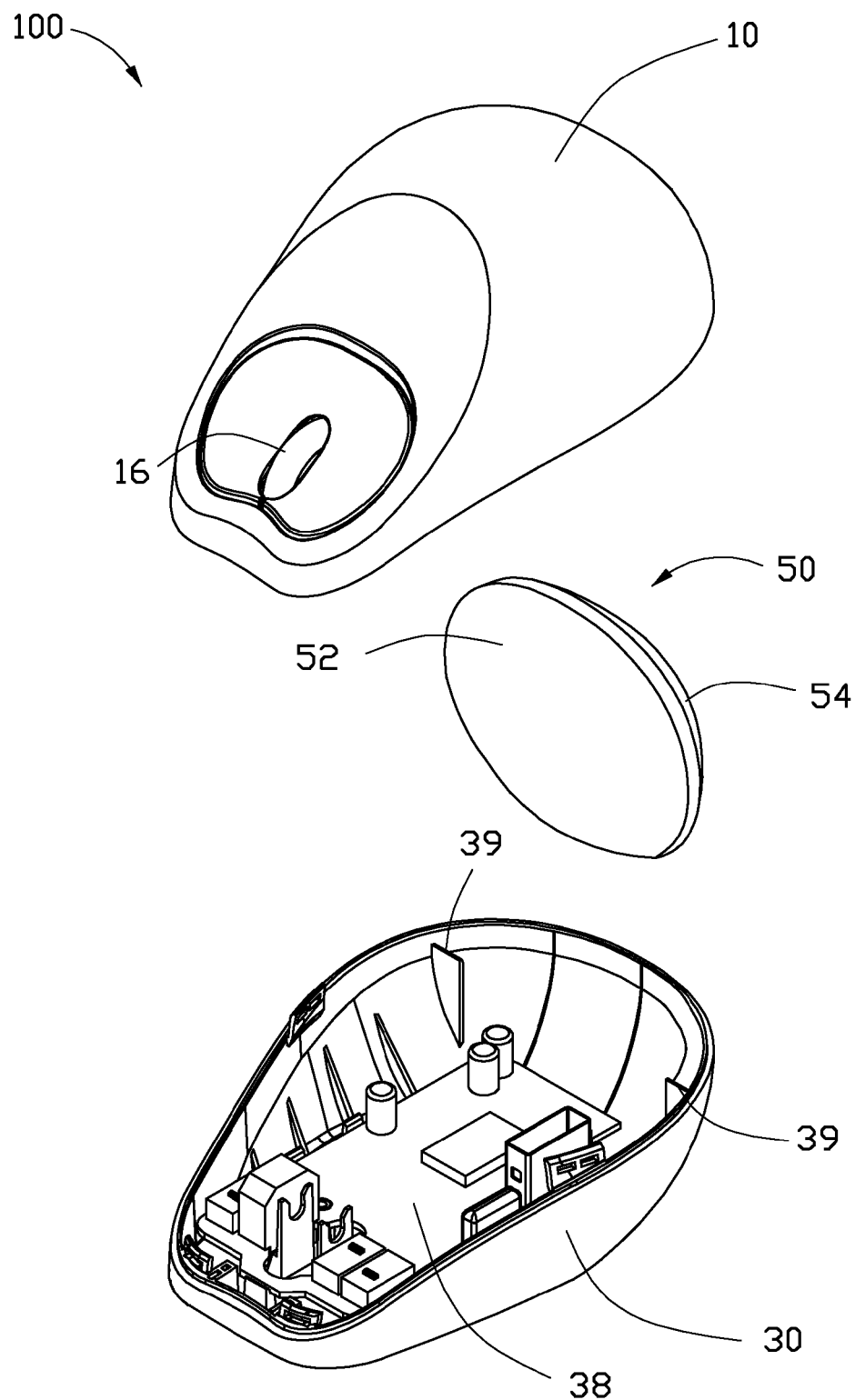
FIG. 1 is an exploded, isometric view of a tumbler mouse according to an exemplary embodiment.
Figure 2:
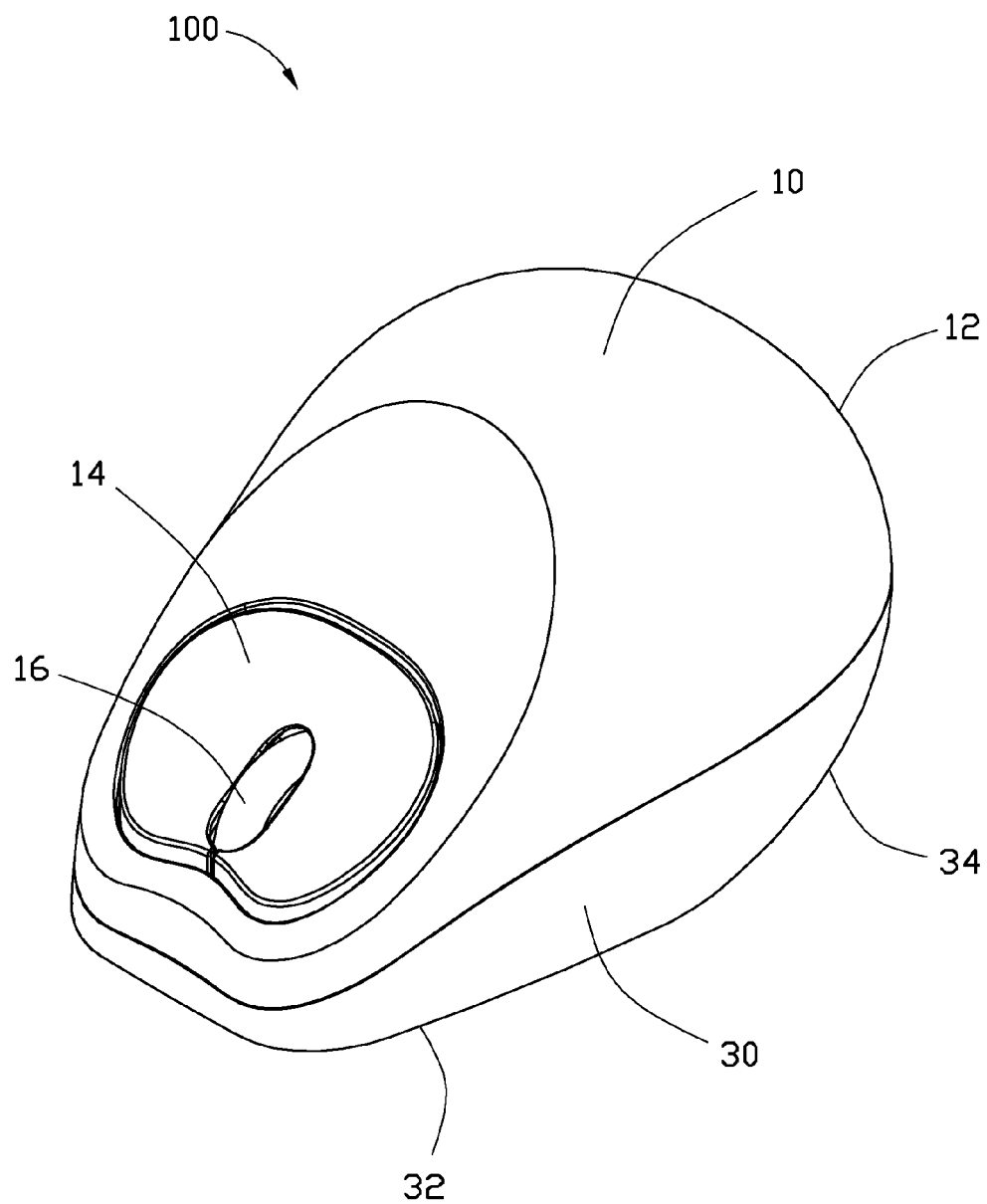
FIG. 2 is an assembled view of the tumbler mouse shown in FIG. 1.

FIG. 1 and FIG. 2 show an exemplary embodiment of a tumbler mouse 100 including an upper housing 10, a lower housing 30, and a balancing weight 50.

The upper housing 10 includes a first curved wall 12. A button 14 and a roller 16 are formed at one end of the first curved wall 12. The buttons 14 can operate menu and etc. The roller 16 can turn pages and etc.

The lower housing 30 includes a wall 32 and a second curved wall 34 connecting to the wall 32. The wall 32 and the second curved wall 34 define a receiving chamber 38 for accommodating the balancing weight 50, electronic components (not shown) and etc. One or more symmetric plates 39 are secured on an inside surface of the second curved wall 34 and accommodated in the receiving chamber 38. The balancing weight 50 can be positioned by the plates 39.

Figure 3:
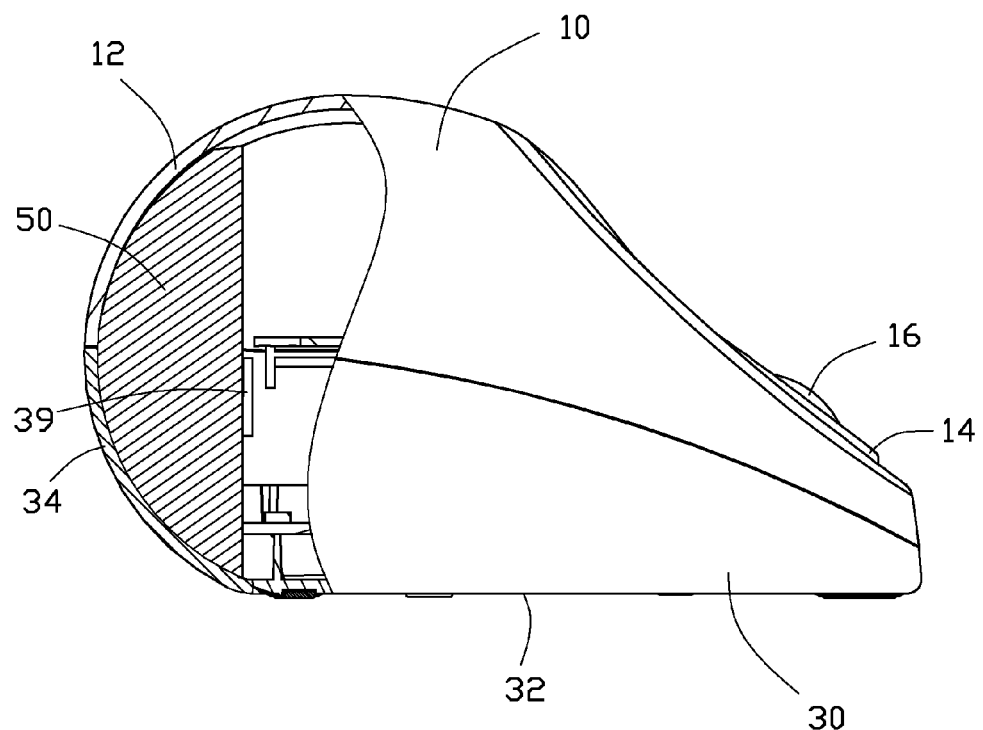
FIG. 3 is a partially cross-sectional view of the tumbler mouse shown in FIG. 2.

Referring to FIG. 3, the balancing weight 50 can be made of metal, and includes a planar surface 52 and an arcuate surface 54 opposite to the planar surface 52. The planar surface 52 can abut the plates 39. The arcuate surface 54 can match with the first curved wall 12 and the second curved wall 34. Thus, the balancing weight 50 can be secured in the tumbler mouse 100. The weight of the balancing weight 50 should heavy enough so that when the tumbler mouse 100 is in a standing condition (shown in FIG. 5), the tumbler mouse 100 can sway as a tumbler. However, when the tumbler mouse 100 is pressed on a support surface 90 (shown in FIG. 4) by an external force, the tumbler mouse 100 can not automatically stand up.

Figure 4:
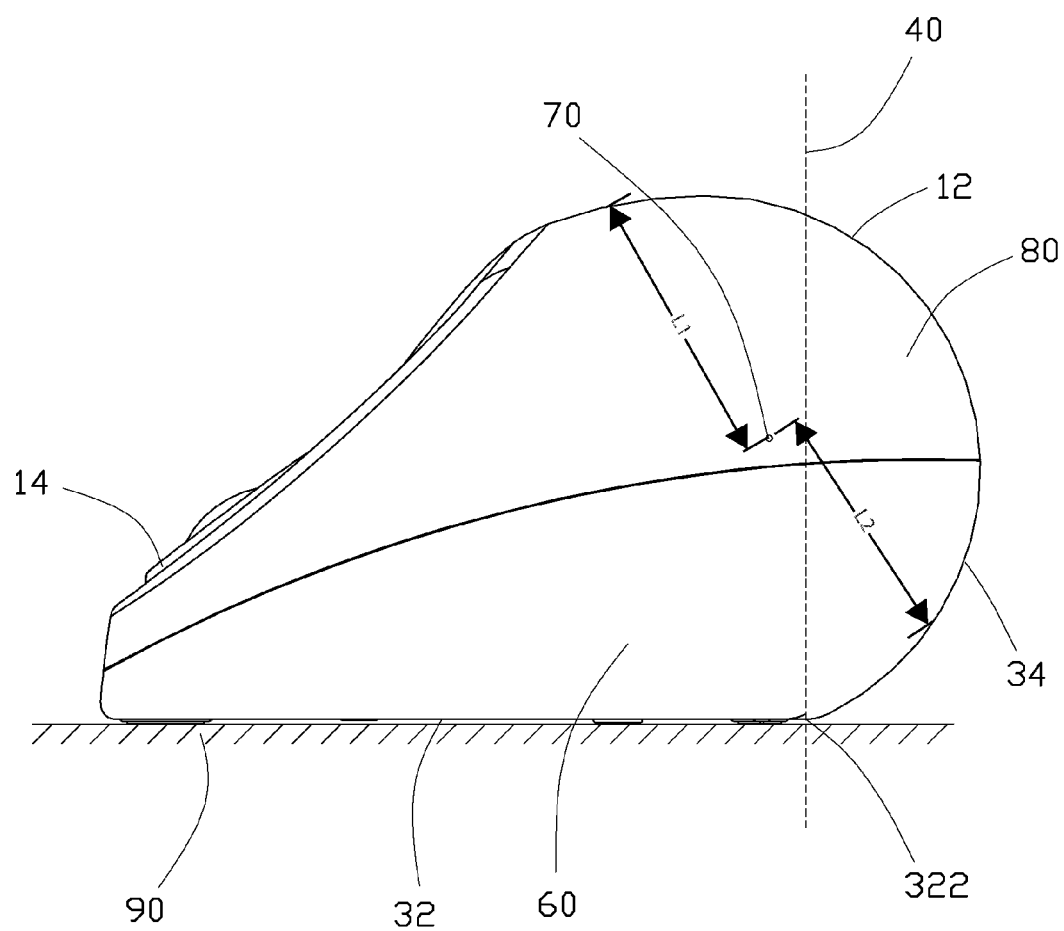
FIG. 4 is a schematic view of the tumbler mouse lying on a support surface.
Figure 5:
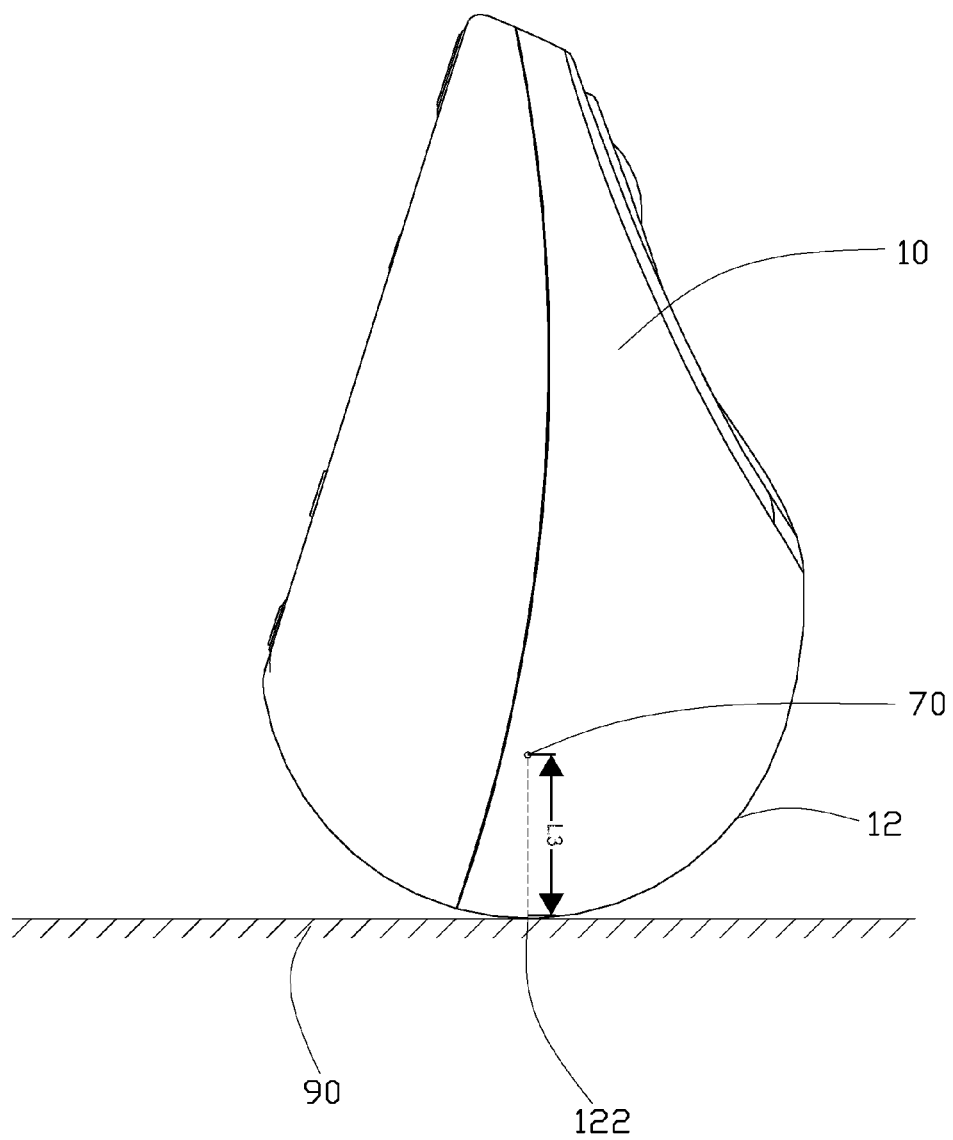
FIG. 5 is a schematic view of the tumbler mouse standing on the support surface shown in FIG. 4.

Referring to FIGS. 4 and 5, in assembly, the balancing weight 50 is positioned by the plates 39. One portion of the arcuate surface 54 matches with the second curved wall 34. Thus, the balancing weight 50 is secured in the lower housing 30. The upper housing 10 is assembled on the lower housing 30. The arcuate surface 54 matches with the first curved wall 12. Thus, the balancing weight 50 is secured in the tumbler mouse 100.

When the tumbler mouse 100 is placed on the support surface 90 in a lying condition (shown in FIG. 4), a support point 322 is defined at a junction of the second curved wall 34 and the wall 32. An imaginary plane 40, which passes through the support point 322 and is perpendicular to the support surface 90, is defined. The tumbler mouse 100 is divided into a main portion 60 and a swaying portion 80 by the imaginary plane 40.

The balancing weight 50 makes the tumbler mouse 100 have a center of gravity 70 located in the main portion 60. The center of gravity 70 is positioned so when the tumbler mouse 100 is pressed towards the support surface 90 by an external force, the tumbler mouse 100 can not automatically stand up.

However, the positioning of the center of gravity 70 also assures that when the tumbler mouse 100 is stood vertically on the support surface 90 at a contacting point 122, a distance between the center of gravity 70 and the contacting point 122 L3 is less than any distances L1 and L2 from the center of gravity 70 to the first curved wall 12 or second curved wall 34. With this weight balance 50, the tumbler mouse 100 can sway around the contacting point 122 as a tumbler.

The tumbler mouse 100 can sway as a tumbler on the support surface 90, and when is pressed on the support surface 90 by an external force, the tumbler mouse 100 can not automatically stand up. Operators can use the tumbler mouse 100 as an input device. When the operators apply a force to drive the tumbler mouse 100 to stand up, the tumbler mouse 100 can sway as a tumbler on the support surface 90 again. Therefore, the tumbler mouse 100 is not only as an input device but also as a toy. The tumbler mouse 100 can bring enjoyment to work.

Figure 6:
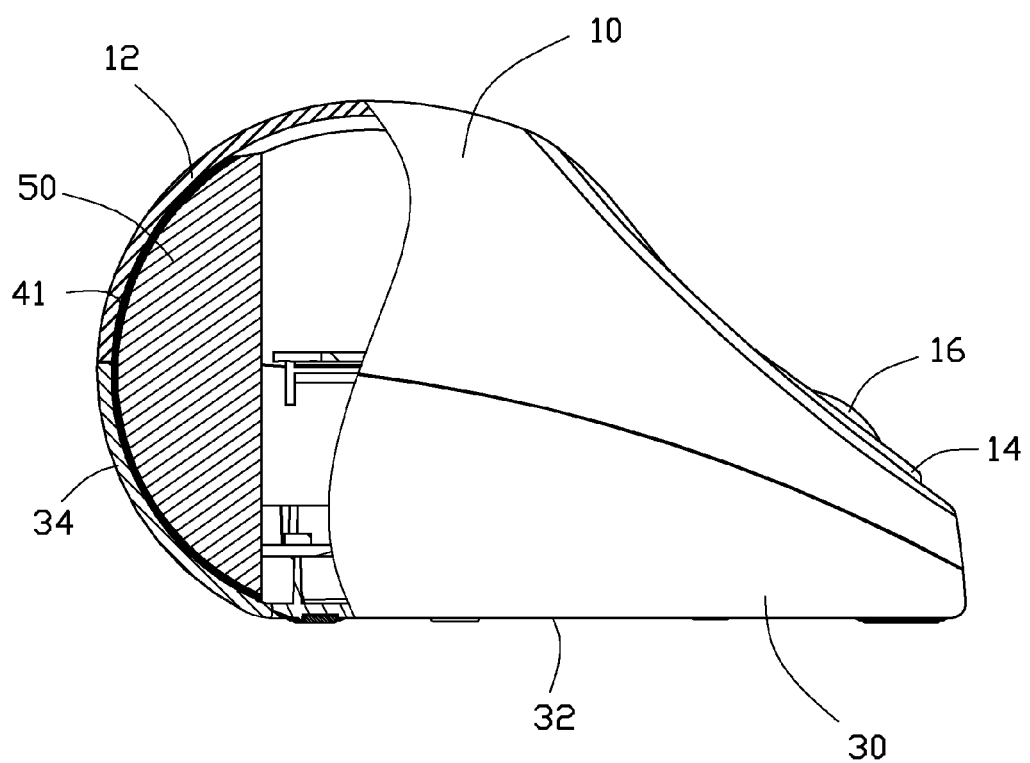
FIG. 6 is a partially cross-sectional view of the tumbler mouse according to another exemplary embodiment.

It is to be understood, the plates 39 can be omitted, the balancing weight 50 can be attached to the lower housing 30 by adhesive 41 (shown in FIG. 6) according to another exemplary embodiment. In addition, the plate 39 may adopts other configuration function as latching plate to fix the balancing weight 50 in the chamber 38.

It is to be understood, the upper housing 10 and the lower housing 30 can be seemed as an integral a housing, correspondingly, the first curved wall 12 and the second curved wall 34 can be seemed as an integral curved wall.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tumbler mouse, comprising:
   a housing including a swaying portion and a main portion divided by an imaginary plane; the swaying portion including a curved wall connecting to a planar wall of the housing, a support point being formed at a joining point of the curved wall and the planar wall, wherein when the tumbler mouse is laid down on a support surface, the imaginary plane passes through the support point and is perpendicular to the support surface; and a balancing weight secured in the swaying portion, wherein the position of the balancing weight makes the tumbler mouse have a center of gravity located on a side of the imaginary plane away from the swaying portion and when the tumbler mouse perpendicularly stands on the support surface at a contacting point, a distance between the center of gravity and the contacting point is less than any distance from the center of gravity to the curved wall.

2. The tumbler mouse as claimed in claim 1, wherein at least one latching plate is secured on an inside of the curved wall, the balancing weight latches to the latching plate.

3. The tumbler mouse as claimed in claim 2, wherein the balancing weight comprises a planar surface and an arcuate surface opposite to the planar surface, the planar surface abuts the at least one latching plate.

4. The tumbler mouse as claimed in claim 1, wherein the housing comprises a receiving chamber, the balancing weight is secured in the receiving chamber by adhesive.

5. A tumbler mouse, comprising:
   an upper housing;
   a lower housing matching with the upper housing to form a swaying portion and a main portion divided by an imaginary plane; the swaying portion including a curved wall connecting to a planar wall of the lower housing at a support point, wherein the imaginary plane passing through the support point and perpendicular to a support surface is formed between the swaying portion and the main portion; and
   a balancing weight secured in the swaying portion; the balancing weight makes the tumbler mouse have a center of gravity located in the main portion; the curved wall has a contacting point contacting with the support surface when the tumbler mouse perpendicularly stands on the support surface, a distance between the center of gravity and the contacting point is less than any distance from the center of gravity to the curved wall.

6. The tumbler mouse as claimed in claim 5, wherein at least one latching plate is secured on an inside of the curved wall, the balancing weight latches to the latching plate.

7. The tumbler mouse as claimed in claim 6, wherein the balancing weight comprises a planar surface and an arcuate surface opposite to the planar surface, the planar surface abuts the at least one latching plate.

8. The tumbler mouse as claimed in claim 5, wherein the lower housing comprises a receiving chamber, the balancing weight is secured in the receiving chamber by adhesive.

9. A tumbler mouse, comprising:
   a housing including a swaying portion and a main portion divided by an imaginary plane, the swaying portion including a curved wall connecting to a planar wall of the housing at a support point, the imaginary plane passing through the support point and perpendicular to a support surface is formed between the swaying portion and the main portion;
   a balancing weight secured in the swaying portion;
   wherein when the tumbler mouse is laid down on a support surface, the tumbler mouse can not automatically stand up; and when the tumbler mouse is stood up on the support surface, a force can be applied to the tumbler mouse to cause the tumbler mouse to sway as a tumbler.

10. The tumbler mouse as claimed in claim 9, wherein the balancing weight makes the tumbler mouse have a center of gravity located on a side of the imaginary plane away from the swaying portion.

11. The tumbler mouse as claimed in claim 10, wherein when the tumbler mouse perpendicularly stands on the support surface at a contacting point, a distance between the center of gravity and the contacting point is less than any distance from the center of gravity to the curved wall.

12. The tumbler mouse as claimed in claim 11, wherein at least one latching plate is secured on an inside of the curved wall, the balancing weight latches to the latching plate.

13. The tumbler mouse as claimed in claim 12, wherein the balancing weight comprises a planar surface and an arcuate surface opposite to the planar surface, the planar surface abuts the at least one latching plate.

14. The tumbler mouse as claimed in claim 11, wherein the lower housing comprises a receiving chamber, the balancing weight is secured in the receiving chamber by adhesive.

* * * * *